United States Patent
Walsh et al.

(10) Patent No.: US 9,395,462 B2
(45) Date of Patent: Jul. 19, 2016

(54) METAL DETECTOR WITH A BATTERY SUPPORT SURFACE TO FACILITATE REMOVAL OF A BATTERY AND A MOVABLE DOOR TO SELECTIVELY PERMIT ACCESS TO AN AUDIO CONNECTOR

(71) Applicants: Thomas P Walsh, El Paso, TX (US); John C. Griffin, Las Cruces, NM (US); Mark E. Krieger, El Paso, TX (US)

(72) Inventors: Thomas P Walsh, El Paso, TX (US); John C. Griffin, Las Cruces, NM (US); Mark E. Krieger, El Paso, TX (US)

(73) Assignee: First Texas Products, LLC, El Paso, TX (US)

( * ) Notice: Subject to any disclaimer, the term of this patent is extended or adjusted under 35 U.S.C. 154(b) by 327 days.

(21) Appl. No.: 13/680,606

(22) Filed: Nov. 19, 2012

(65) Prior Publication Data

US 2014/0139210 A1    May 22, 2014

(51) Int. Cl.
*G01V 3/10* (2006.01)
*G01V 3/15* (2006.01)

(52) U.S. Cl.
CPC .... *G01V 3/10* (2013.01); *G01V 3/15* (2013.01)

(58) Field of Classification Search
None
See application file for complete search history.

(56) References Cited

U.S. PATENT DOCUMENTS

| | | | |
|---|---|---|---|
| 4,514,692 A | 4/1985 | Johnson et al. | |
| 4,628,265 A | 12/1986 | Johnson et al. | |
| 4,868,504 A | 9/1989 | Johnson | |
| D377,908 S | 2/1997 | Yue | |
| 5,786,696 A * | 7/1998 | Weaver et al. | 324/329 |
| 5,922,489 A * | 7/1999 | Adachi | 429/100 |
| D533,792 S | 12/2006 | Johnson et al. | |
| 7,310,060 B2 * | 12/2007 | Stilwell et al. | 342/22 |
| 7,490,370 B2 * | 2/2009 | Macey et al. | 4/559 |
| D605,956 S | 12/2009 | Hu | |
| 7,916,458 B2 * | 3/2011 | Nelson et al. | 361/623 |
| D652,330 S | 1/2012 | Arnold et al. | |

OTHER PUBLICATIONS

First Texas Product, L.P.; Teknetics T2TM, Professional Metal Detector, Comprehensive Operating Manual and Guide to Metal Detecting; Jul. 13, 2009; 36 pages.

* cited by examiner

*Primary Examiner* — Minh N Tang
(74) *Attorney, Agent, or Firm* — Faegre Baker Daniels LLP

(57) ABSTRACT

A metal detector includes a control housing electrically coupled to a search coil. The control housing includes a battery compartment having a first battery support surface located adjacent and a second battery support surface aligned at an angle relative to the first battery support surface to facilitate removal of a battery from the battery compartment. The metal detector also includes a movable door coupled to the control housing. The door is movable from a first, open position to permit access to an audio connector and a second, closed position covering the audio connector.

18 Claims, 7 Drawing Sheets

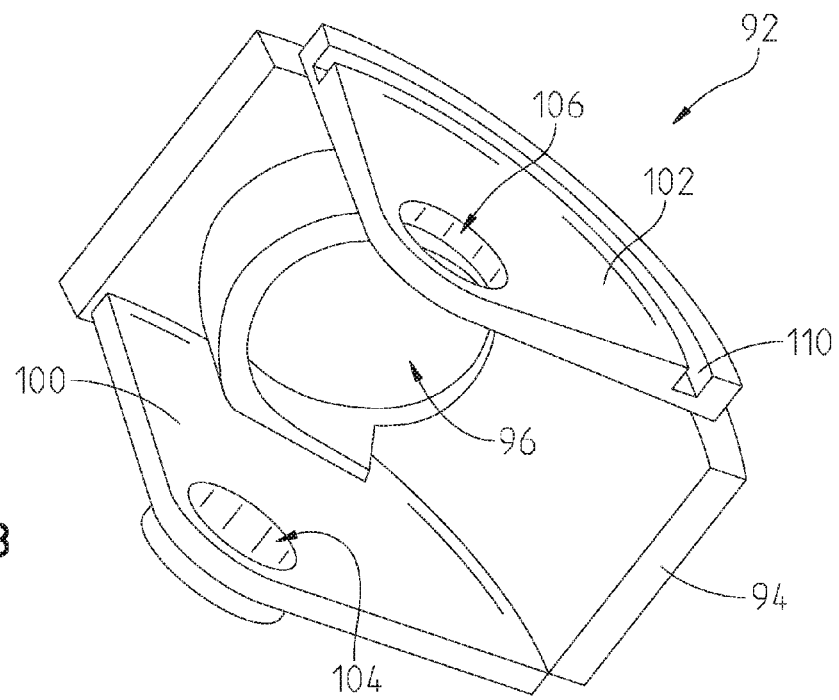
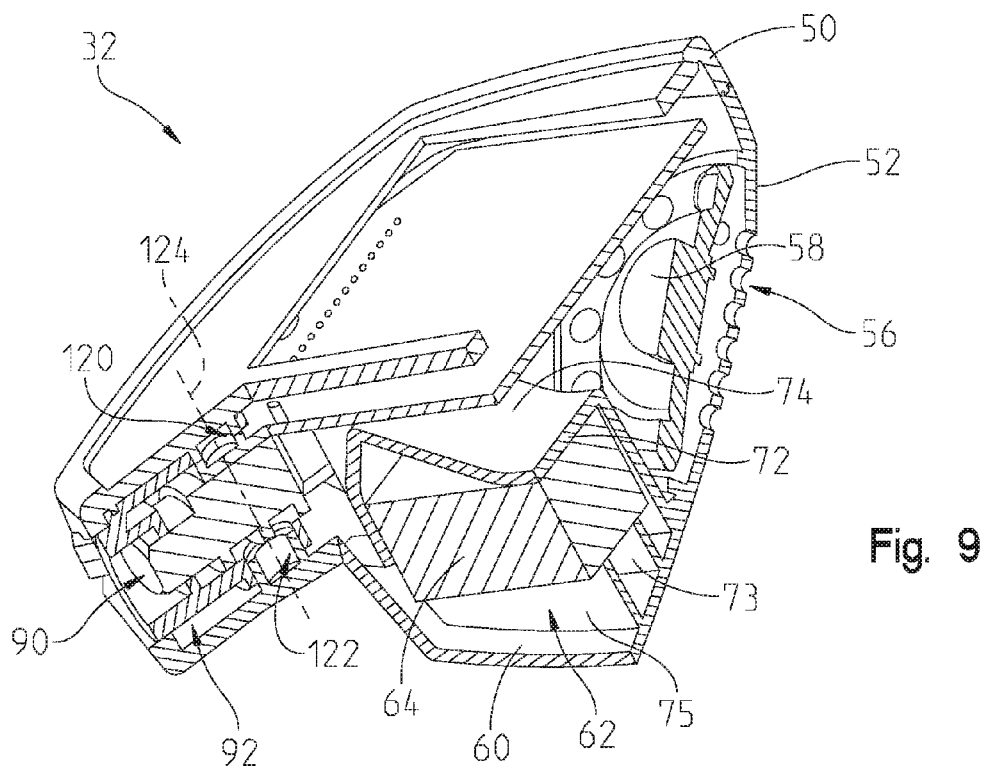

METAL DETECTOR WITH A BATTERY SUPPORT SURFACE TO FACILITATE REMOVAL OF A BATTERY AND A MOVABLE DOOR TO SELECTIVELY PERMIT ACCESS TO AN AUDIO CONNECTOR

BACKGROUND AND SUMMARY OF THE DISCLOSURE

The present disclosure relates to improved components for a hand held metal detector.

Hand held metal detectors are well known. Such metal detectors generate a magnetic field and then detect when metal objects located near a search coil of the detector cause changes in the generated magnetic field. Metal detectors provide a visual indication on a display or an audio indication to alert an operator that metal has been detected. Certain metal detectors include improved coil designs which permit discrimination between different types of detected metal. Conventional metal detectors typically use one of three technologies. These technologies include very low frequency (VLF) detection, pulse induction (PI) detection, and beat-frequency oscillation (BFO) detection. The features of the present disclosure are not limited to a particular type of metal detector.

In an illustrated embodiment of the present disclosure, a metal detector includes an elongated support shaft, a search coil pivotably coupled to a first end of the support shaft, and a control housing coupled to the support shaft spaced apart from the search coil. The control housing is electrically coupled to the search coil. The control housing includes a battery compartment having electrical contacts configured to engage contacts of a battery located in the battery compartment. The battery compartment includes a first battery support surface located adjacent the contacts and a second battery support surface spaced apart from the contacts. The second battery support surface is aligned at an angle relative to the first battery support surface to facilitate removal of the battery from the battery compartment.

In another illustrated embodiment of the present disclosure, a metal detector includes an elongated support shaft, a search coil pivotably coupled to a first end of the support shaft, and a control housing coupled to the support shaft spaced apart from the search coil. The control housing is electrically coupled to the search coil. The control housing includes an audio connector. The metal detector also includes a movable door coupled to the control housing. The door is movable from a first, open position to permit access to the audio connector and a second, closed position covering the audio connector.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and additional features of the present system and method will become more readily appreciated and become better understood by reference to the following detailed description when taken in conjunction with the accompanying drawings.

FIGS. 7 and 8 are perspective views of a movable door for covering an audio connector located in the control housing;

FIG. 9 is a sectional view taken through the control housing illustrating how the movable door of FIGS. 7 and 8 is attached to the housing;

Figure 1:
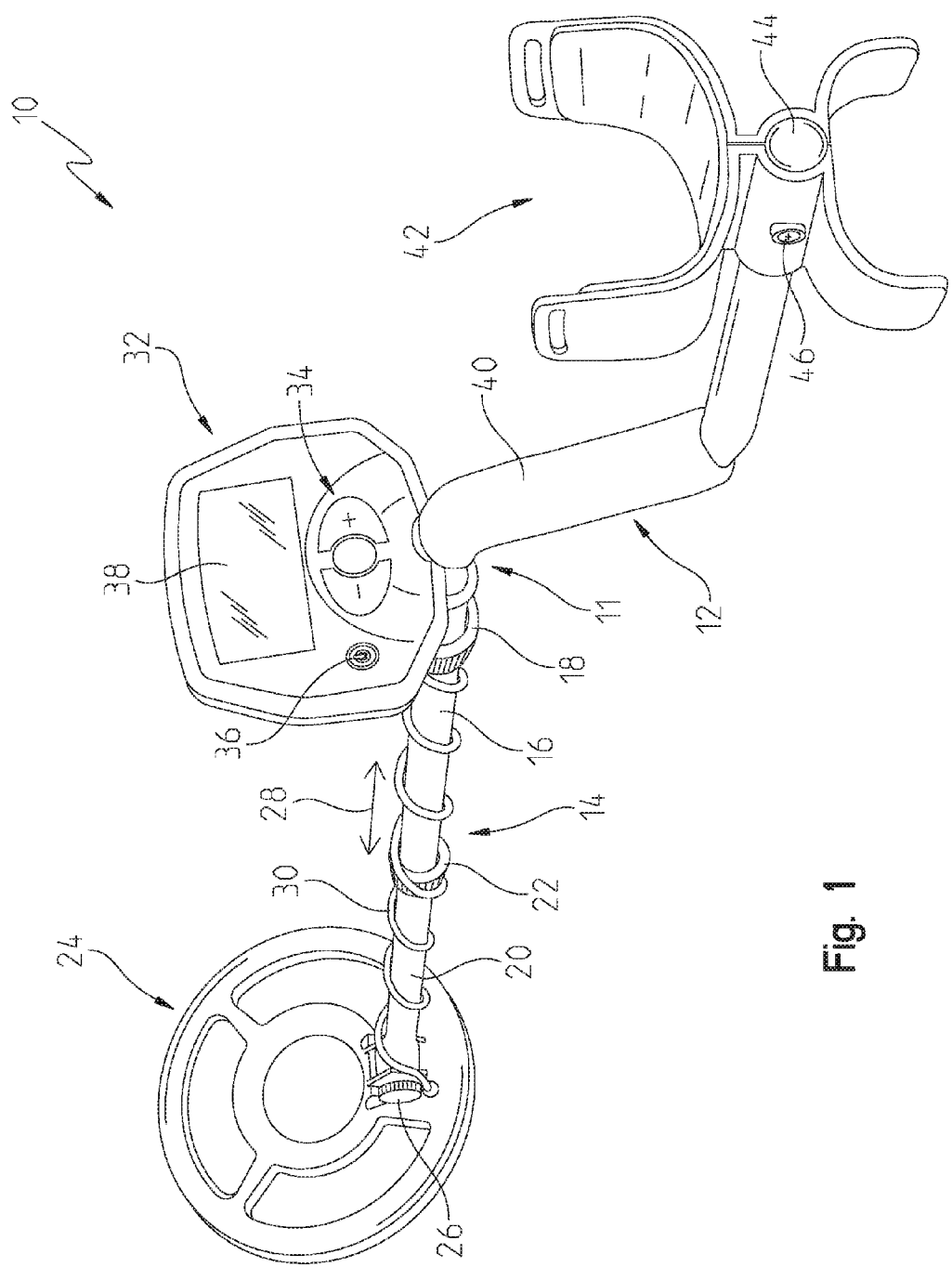
FIG. 1 is a perspective view of a metal detector of an illustrated embodiment of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Referring now to the drawings, FIG. 1 illustrates a metal detector 10 having a support shaft 11 including an upper s-rod portion 12 and an adjustable lower portion 14. Illustratively, lower portion 14 of shaft 11 includes an upper stem 16 coupled to s-rod 12 by a first locking collar 18 and a lower stem 20 coupled to the upper stem 16 by a second locking collar 22. By loosening locking collars 18 and 22, a length of lower rod 14 is adjustable shown by double headed arrow 28.

A search coil 24 is pivotably coupled to a distal end of lower stem 20 by a fastener 26 so that the search coil is movable relative to the lower rod 14. The search coil 24 is the part of metal detector 10 that actually senses the metal. Search coil 24 is also known as a "search head", "loop" or "antenna".

Figure 2:
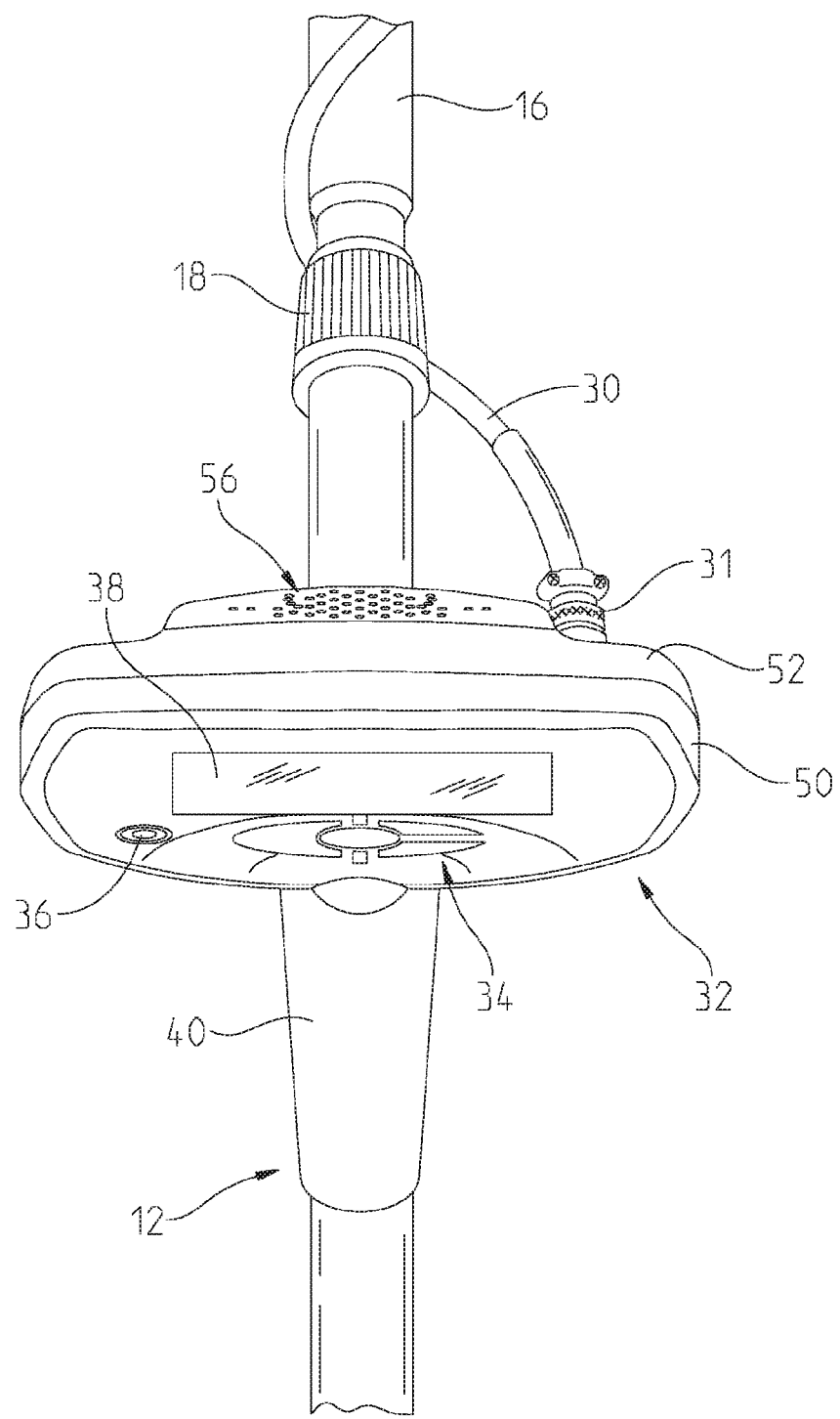
FIG. 2 is a top view of a control housing of the metal detector of FIG. 1.
Figure 3:
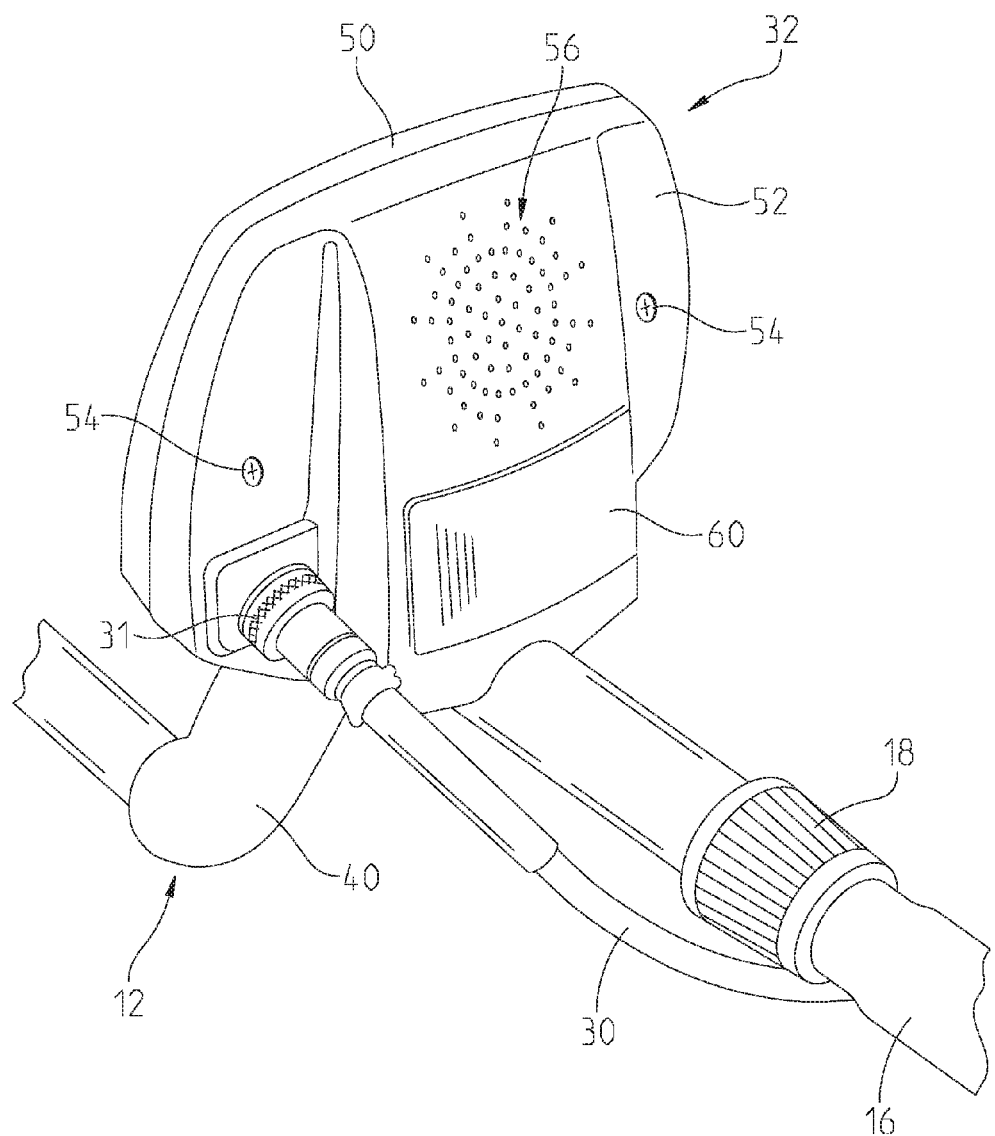
FIG. 3 is a rear perspective view of the control housing of the metal detector of FIG. 1.

A search coil cable 30 is coupled to the search coil 24 and to a control housing 32 via a removable plug 31 (see FIGS. 2 and 3). Control housing 32 typically contains circuitry, controls, a speaker, one or more batteries and a microprocessor as discussed below. Control housing 32 illustratively includes user inputs 34, and on/off switch 36 and a display 38.

A hand grip 40 is located on a portion of s-rod 12 adjacent control housing 32. A stabilizer or arm rest 42 is coupled to a distal end portion 44 of s-rod 12 by a suitable fastener 46. Arm rest 42 is used to keep the detector 10 steady as the operator sweeps it back and forth.

As shown in FIGS. 2 and 3, the control housing 32 includes a front housing portion 50 and a rear housing portion 52 coupled to the front housing portion 50 by fasteners 54. The plug 31 of search coil cable 30 is coupled to an electrical connector 33 located within control housing 32 and accessible through rear portion 50 to as best shown in FIGS. 3-5.

Rear portion 52 of control housing 32 illustratively includes a plurality of apertures 56. Sound from a speaker 58 shown in FIG. 10 passes through the apertures 56. Speaker 58 provides an audio indication when metal is detected. Speaker 58 may also be used for other purposes such as providing instructions to an operator.

Figure 4:
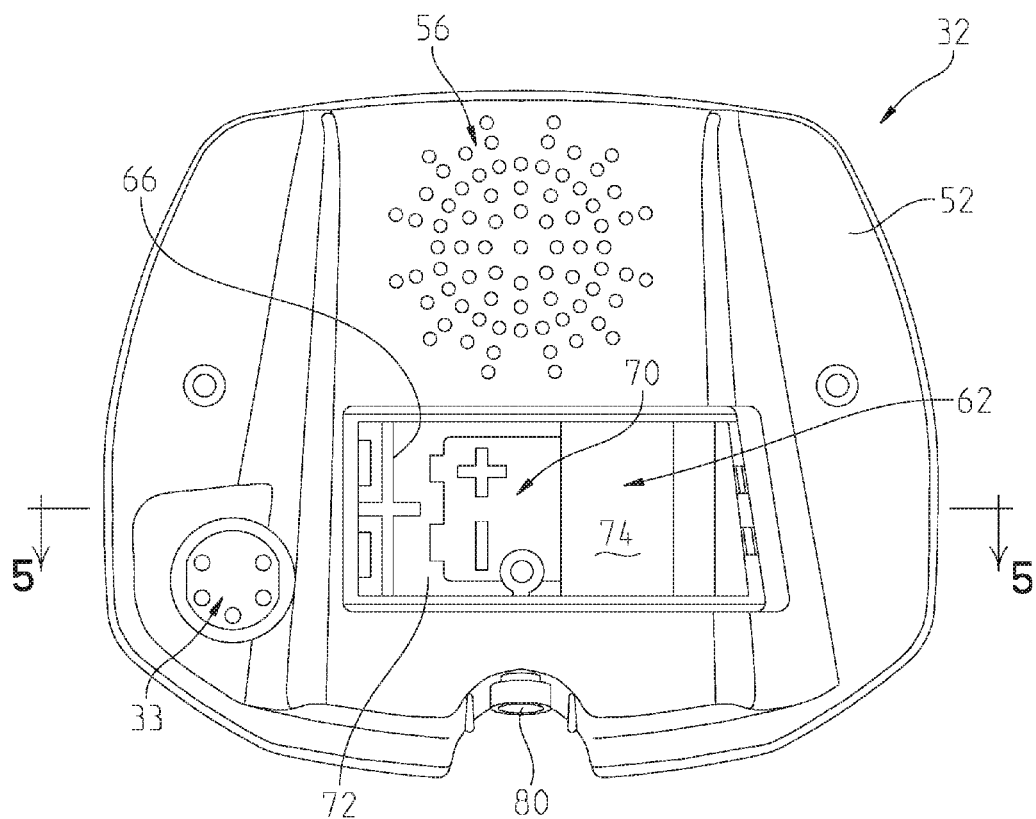
FIG. 4 is a rear view of the control housing of FIGS. 1-3 with a battery cover removed.
Figure 5:
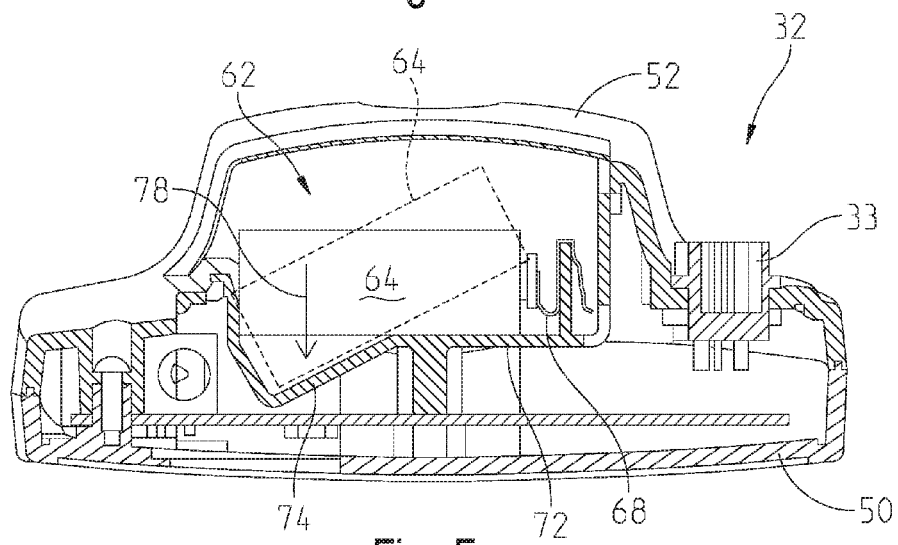
FIG. 5 is a sectional view taken along lines 5-5 of FIG. 4 illustrating details of a battery compartment of the control housing.
Figure 6:
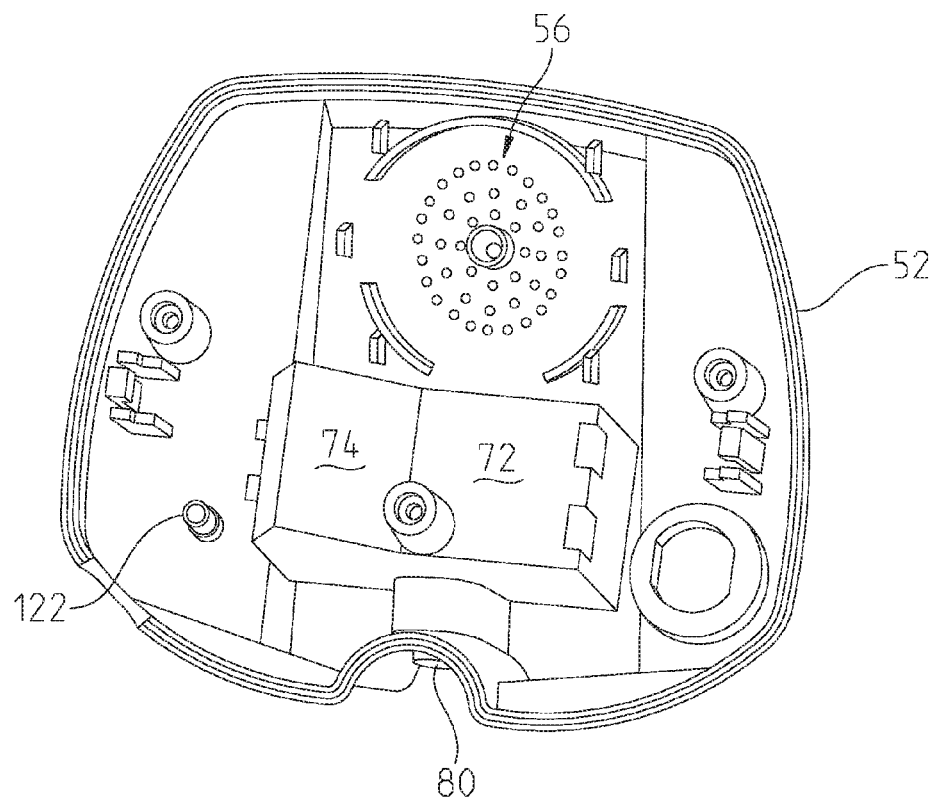
FIG. 6 is a perspective view of an inside surface of a rear portion of the control housing.

Rear portion 52 of control panel 32 also includes a battery cover 60 located over a battery compartment 62 best shown in FIGS. 4-6. The battery compartment 62 is configured to facilitate installation and removal of a battery 64 from the battery compartment 62. Battery compartment 62 includes a wall 66 for supporting a pair of electrical contacts 68 (see FIG. 5) for engaging positive and negative contacts of battery 64. The contacts 68 are coupled to electronic circuitry within the control housing 32.

Battery compartment 62 includes an indicator 70 formed on a first support surface 72 located adjacent contacts 68. The indicator 70 provides a visual indication of the required orientation of the battery 64.

Compartment 62 includes a second support surface 74 aligned at an angle relative to first support surface 72 to provide an inclined or ramped surface 74 within the battery compartment 62. The alignment of surfaces 72 and 74 of battery compartment 62 facilitates removal of battery 64 from the battery compartment 62. As best shown in FIG. 5, battery 64 is installed in the solid line position during normal operation of the metal detector 10. When it is necessary to remove and replace the battery 64, an operator presses downwardly on a portion of battery 64 above inclined surface 74 in the direction of arrow 78. This causes the battery 64 to pivot to the dotted position shown in FIG. 5 which facilitates removal of the battery 64 from the battery compartment 62. Although one battery 64 is shown, more than one battery may be located in the battery compartment 64 in other embodiments. As shown in FIG. 5, the first and second support surfaces 72, 74 form a reflex angle greater than 180 degrees therebetween.

The battery compartment cover 60 includes a plurality of fins 73, 75 formed on an inner surface. The fins 73, 75 are located near battery 64 to retain the battery 64 in the required position during operation as shown in FIG. 9.

FIG. 4 illustrates threaded portions 80 formed in the rear portion 52 of control housing 32. The threaded portions 80 are configured to receive fasteners (not shown) to couple the control housing 32 to the s-rod 12.

As discussed above, the metal detector 10 provides an audio indication when metal is detected or for other purposes. Sound is projected from speaker 58 through openings 56 in control housing 32 as discussed above. In addition, control housing 32 includes a headphone jack or an audio connector 90 shown in FIGS. 9 and 10. The operator couples a connector of headphones (not shown) to audio connector 90, if desired.

Figure 7:
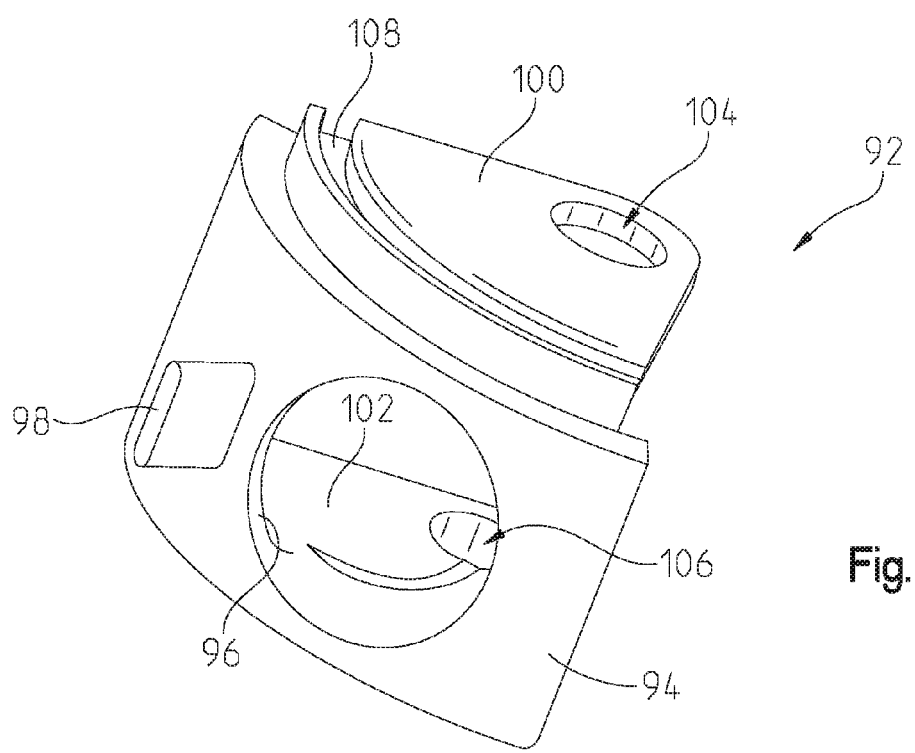

An illustrative embodiment of the present disclosure includes a movable door 92 coupled to front and rear portions 50 and 52 of control housing 32. Door 92 is best shown in FIGS. 7 and 8. Door 92 includes an arcuate surface 94 having an opening 96 formed therein. A tab 98 is formed on surface 94 adjacent opening 96. First and second side walls 100 and 102 extend away from opposite sides of arcuate surface 94. Side walls 100 and 102 include openings 104 and 106, respectively. Side walls 100 and 102 also include arcuate channels 108 and 110, respectively.

As best shown in FIG. 9, the movable door 92 is located between the front portion 50 and rear portion 52 of control housing 32. Front portion 50 is formed to include a front axle 120 and rear housing portion 52 is formed to include a rear axle 122. When the front and rear portions 50 and 52 of the control housing 32 are coupled together, front axle 120 and rear axle 122 are located within openings 104 and 106, respectively, of side walls 100 and 102 of door 92. In an illustrative embodiment, the channels 108 and 110 of door 92 receive guide portions formed in front and rear housing portions 50 and 52, respectively. Therefore, door 92 rotates about axis of rotation 124 from a first, open position in which opening 96 in arcuate surface 94 is located above the audio connector 90 as shown in FIG. 10 to a second, closed position in which the arcuate surface 94 covers the audio connector 90 as best shown in FIG. 11.

Figure 10:
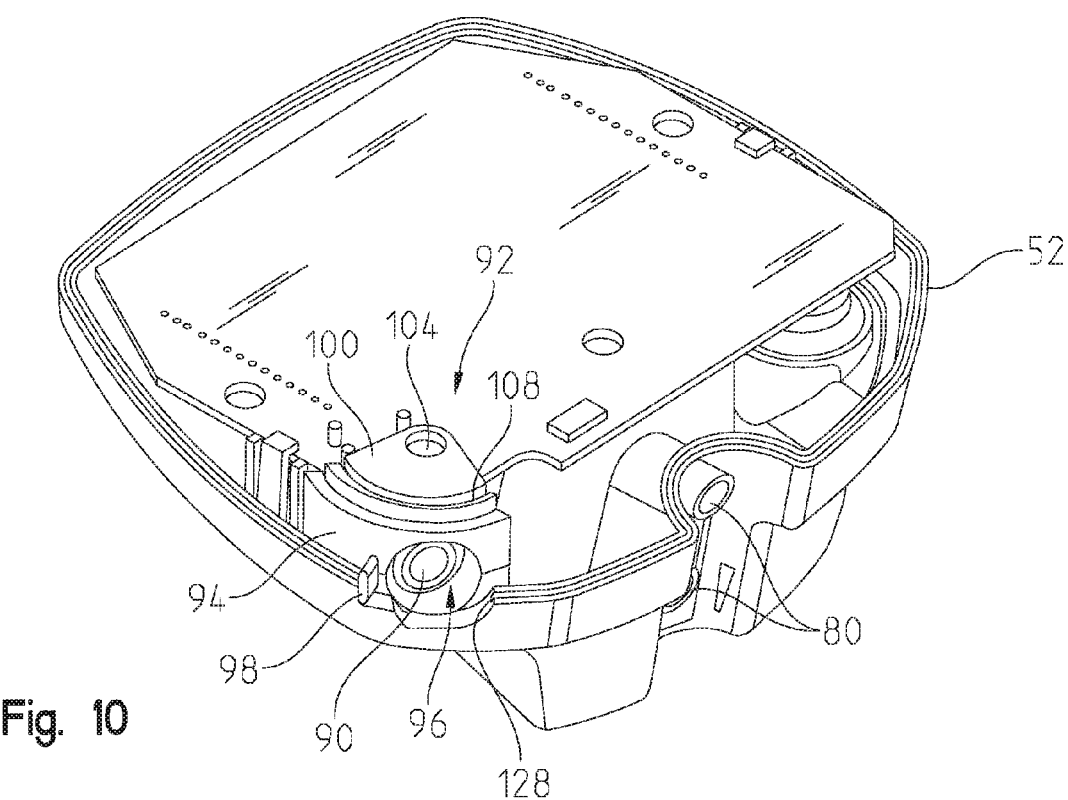
FIG. 10 is a perspective view of the control housing with a front portion removed and the movable door in an open position to expose the audio connector.
Figure 11:
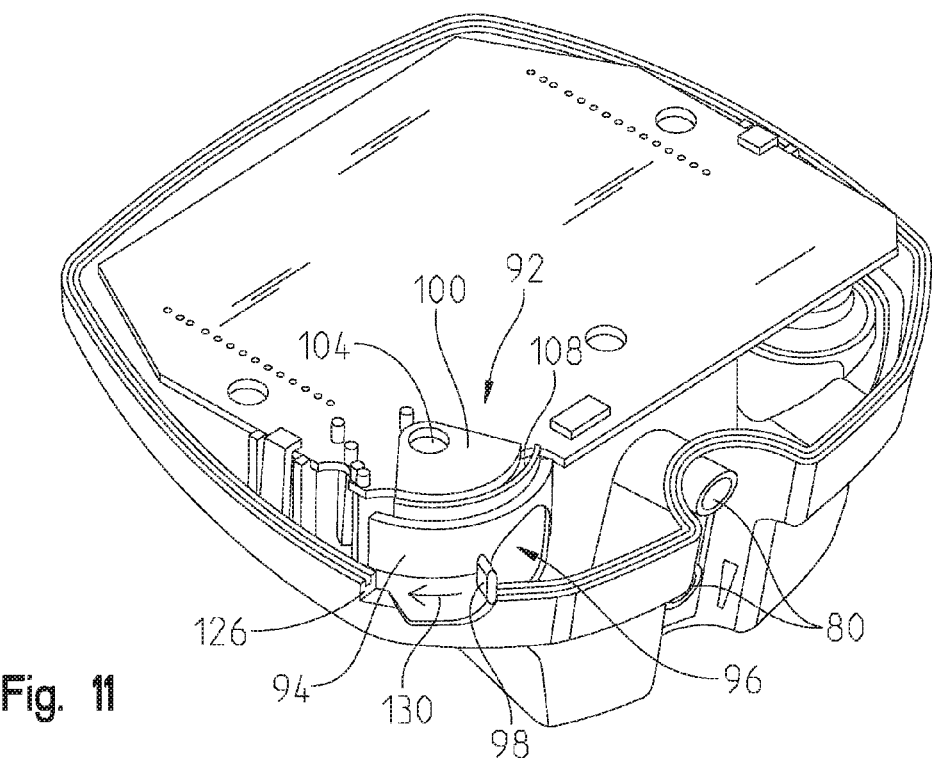
FIG. 11 is a perspective view of the control housing similar to FIG. 10 with the movable door in a closed position to cover the audio connector.

Tab 98 of door 92 abuts a first surface 126 of control housing 32 when the door 92 is in the open position shown in FIG. 10. Tab 98 abuts a second surface 128 of control housing 32 when door is in its closed position shown in FIG. 11. In an illustrative embodiment, a detent is provided to hold the door 92 in its closed position. The door 92 may be pivoted from its closed position shown in FIG. 11 to its open position in FIG. 10 by pushing tab 98 in the direction of arrow 130 of FIG. 11. Therefore, opening 96 moves over audio connector 90 to permit the headphone connector to be inserted into audio connector 90.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A metal detector comprising:
an elongated support shaft;
a search coil pivotably coupled to a first end of the support shaft; and
a control housing coupled to the support shaft spaced apart from the search coil, the control housing being electrically coupled to the search coil, and wherein the control housing includes a battery compartment having a plurality of electrical contacts configured to engage a plurality of contacts of a battery located in the battery compartment, the battery compartment including a first battery support surface located adjacent the plurality of contacts and a second battery support surface spaced apart from the contacts, the second battery support surface being aligned at an angle relative to the first battery support surface to facilitate removal of the battery from the battery compartment, the first battery support surface and the second battery support surface sized and positioned so that the battery is positioned over the first battery support surface and the second battery support surface when the plurality of contacts of the battery engage the plurality of electrical contacts of the battery compartment, the first battery support surface arranged to support the battery when the plurality of contacts of the battery engage the plurality of electrical contacts of the battery compartment, the second battery support surface arranged such that the second battery support surface is spaced from the battery and does not support the battery when the plurality of contacts of the battery engage the plurality of electrical contacts of the battery compartment.

2. The metal detector of claim 1, wherein the contacts of the battery engage the contacts of the control housing when the battery abuts the first battery support surface and wherein the contacts of the battery are spaced apart from the contacts of the control housing when the battery abuts the second battery support surface.

3. The metal detector of claim 1, wherein the first and second support surfaces form a reflex angle greater than 180 degrees therebetween.

4. The metal detector of claim 1, further comprising an indicator on the first battery support surface to provide an indication of a required orientation of the battery within the battery compartment.

5. The metal detector of claim 1, further comprising a cover located over the battery compartment, the cover including a plurality of fins formed on an inner surface to hold the battery in a desired orientation within the battery compartment during operation.

6. The metal detector of claim 1, wherein the control housing includes an audio connector and a movable door coupled to the control housing, the door being movable from a first, open position to permit access to the audio connector and a second, closed position covering the audio connector to preclude access to the audio connector.

7. The metal detector of claim 6, wherein the movable door includes an arcuate surface having an opening formed therein, and when the door is in the first, open position the opening in the arcuate surface is located above the audio connector and when the door is in the second, closed position a portion of the arcuate surface located adjacent the opening covers the audio connector.

8. The metal detector of claim 7, further comprising a tab formed on the arcuate surface to facilitate movement of the door between the first, open position and the second, closed position.

9. A metal detector comprising:
an elongated support shaft;
a search coil pivotably coupled to a first end of the support shaft;
a control housing coupled to the support shaft spaced apart from the search coil, the control housing being electrically coupled to the search coil, and wherein the control housing includes an audio connector; and
a movable door coupled to the control housing, the door being movable from a first, open position to permit access to the audio connector and a second, closed position covering the audio connector;
wherein the movable door includes an arcuate surface having an opening formed therein, and when the door is in the first, open position the opening in the arcuate surface is located above the audio connector and when the door is in the second, closed position a portion of the arcuate surface located adjacent the opening covers the audio connector; and
wherein the control housing includes a front housing portion formed to include a front axle and rear housing portion formed to include a rear axle, and wherein the door includes first and second side walls extending away from opposite sides of the arcuate surface, the first and second side walls being formed to include first and second openings, respectively, and wherein the front and rear axles are located within first and second openings of first and second side walls, respectively, so that the door rotates about an axis of rotation between the first, open position to the second, closed position.

10. The metal detector of claim 9, wherein the control housing includes a battery compartment having electrical contacts configured to engage contacts of a battery located in the battery compartment, the battery compartment including a first battery support surface located adjacent the contacts and a second battery support surface spaced apart from the contacts, the second battery support surface being aligned at an angle relative to the first battery support surface to facilitate removal of the battery from the battery compartment.

11. A metal detector comprising:
an elongated support shaft;
a search coil pivotably coupled to a first end of the support shaft;
a control housing coupled to the support shaft spaced apart from the search coil, the control housing being electrically coupled to the search coil, and wherein the control housing includes a battery compartment having a plurality of electrical contacts configured to engage a plurality of contacts of a battery located in the battery compartment to define a battery operable position, the battery compartment including a first battery support surface located adjacent the contacts and a second battery support surface spaced apart from the contacts;
a cover sized and shaped to selectively engage the battery in a cover closed position in which the cover maintains a fixed position relative to the control housing,
with the cover in the cover closed position and the battery in the battery operable position, a void is defined between the battery and the second support surface, with the cover in the cover closed position and the battery in the battery operable position, the cover retains the battery in the battery operable position supported by the first support surface and unsupported by the second support surface;
whereby, with the cover moved from the cover closed position and the battery supported by the first support surface, the battery may be pressed into the void toward the second support surface and away from the first support surface to pivot out of the battery operable position to a battery removal position.

12. The metal detector of claim 11, wherein the contacts of the battery engage the contacts of the control housing when the battery abuts the first battery support surface and wherein the contacts of the battery are spaced apart from the contacts of the control housing when the battery abuts the second battery support surface.

13. The metal detector of claim 11, wherein the first and second support surfaces form a reflex angle greater than 180 degrees therebetween.

14. The metal detector of claim 11, further comprising an indicator on the first battery support surface to provide an indication of a required orientation of the battery within the battery compartment.

15. The metal detector of claim 11, wherein the cover includes a plurality of fins formed on an inner surface to hold the battery in a desired orientation within the battery compartment during operation.

16. The metal detector of claim 11, wherein the control housing includes an audio connector and a movable door coupled to the control housing, the door being movable from a first, open position to permit access to the audio connector and a second, closed position covering the audio connector to preclude access to the audio connector.

17. The metal detector of claim 16, wherein the movable door includes an arcuate surface having an opening formed therein, and when the door is in the first, open position the opening in the arcuate surface is located above the audio connector and when the door is in the second, closed position a portion of the arcuate surface located adjacent the opening covers the audio connector.

18. The metal detector of claim 17, further comprising a tab formed on the arcuate surface to facilitate movement of the door between the first, open position and the second, closed position.

\* \* \* \* \*